(12) United States Patent
Williston et al.

(10) Patent No.: US 7,606,645 B2
(45) Date of Patent: Oct. 20, 2009

(54) VEHICLE LOAD MONITORING FOR FOUR WHEEL STEERING

(75) Inventors: Scott L. Williston, Rochester Hills, MI (US); Kevin J. Lavigne, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 701 days.

(21) Appl. No.: 11/029,889

(22) Filed: Jan. 5, 2005

(65) Prior Publication Data

US 2006/0149447 A1 Jul. 6, 2006

(51) Int. Cl.
B62D 7/14 (2006.01)
B62D 6/00 (2006.01)

(52) U.S. Cl. .................. 701/41; 701/69; 180/411; 180/401; 180/282

(58) Field of Classification Search .............. 701/41
See application file for complete search history.

(56) References Cited

U.S. PATENT DOCUMENTS

| | | | |
|---|---|---|---|
| 4,658,927 A * | 4/1987 | Kanazawa | 180/422 |
| 4,687,216 A * | 8/1987 | Kawamoto et al. | 180/409 |
| 4,817,986 A * | 4/1989 | Kanazawa et al. | 280/781 |
| 4,828,064 A * | 5/1989 | Furutani et al. | 180/412 |
| 4,880,072 A * | 11/1989 | Sakamoto et al. | 180/415 |
| 5,019,982 A * | 5/1991 | Furukawa | 701/41 |
| 5,020,619 A * | 6/1991 | Kanazawa et al. | 180/412 |
| 5,430,650 A * | 7/1995 | Susuki et al. | 701/42 |
| 5,860,450 A * | 1/1999 | Trudeau et al. | 137/627.5 |
| 6,580,988 B2 * | 6/2003 | Lin et al. | 701/41 |
| 2007/0017727 A1 * | 1/2007 | Messih et al. | 180/282 |

FOREIGN PATENT DOCUMENTS

JP 61018568 A * 1/1986
JP 01186477 A * 7/1989

* cited by examiner

*Primary Examiner*—Thomas G Black
*Assistant Examiner*—Lin B Olsen

(57) ABSTRACT

Methods and apparatus are provided for automatically determining the steering system calibration of a vehicle in accordance with vehicle loading. The apparatus comprises a combination of a load monitor and a steering controller. The load monitor senses the actual loading of the vehicle and provides a corresponding feedback signal to the steering controller. The steering controller determines a steering calibration appropriate for the load represented by the feedback signal. As a result, the handling performance of the vehicle can be improved over that of a single, fixed steering calibration for a wide range of load conditions.

16 Claims, 9 Drawing Sheets

VEHICLE LOAD MONITORING FOR FOUR WHEEL STEERING

TECHNICAL FIELD

The present invention generally relates to vehicle steering systems, and more particularly relates to the control of vehicle steering under different vehicle load conditions.

BACKGROUND

Four wheel steering systems in motor vehicles typically involve a steering control system for the vehicle rear wheels in addition to the conventional steering control of the vehicle front wheels. Rear wheel steering control is typically used, for example, to reduce vehicle yaw (i.e., deviation from the intended course) in lane change maneuvers. Rear wheel steering control can also increase the stability of a loaded vehicle, such as a vehicle towing a trailer, by reducing trailer sway. The widespread use of higher center of gravity vehicles in recent years has led to the further development of steering systems that control the handling of this type of vehicle.

Variables such as vehicle speed and axle loading can directly affect the type of steering control that is generally desired for safe and efficient handling of a vehicle. Therefore, four wheel steering (4 ws) systems are typically calibrated for different load and speed conditions. That is, one steering control calibration can be set for a normal load category, such as curb weight, and another steering control calibration can be set for a tow load category, such as a trailer towing condition.

However, there are typically significant loading variations within each calibration category. For example, the normal load category may have a weight variation of approximately 2,000 pounds, while the tow load category may include a trailer weight range of approximately 500 to 10,000 pounds. In order to accommodate load variations such as these within a calibration category, 4 ws systems may have their steering calibrations adjusted in order to obtain a performance compromise that can adequately cover the load extremes of that calibration category. For example, the steering calibration for the normal load category may be tuned for reasonably good high speed handling capability at the high weight end of the range, and for acceptable steering sensitivity at the low weight end of the range. Similarly, tuning compromises may also be made in the tow loading category, in order to provide a reasonably satisfactory steering calibration for the wide range of trailer weights, or other towed loads, such as boats and the like.

For a driver, however, the selection of an appropriate steering calibration category (normal load or tow load) may not be obvious in certain types of situations. For example, if the driver wants to tow a light trailer, he may find that the normal load calibration category actually provides better steering performance under certain driving conditions than the tow load calibration category. On the other hand, the selection of normal load steering for a towing situation may not provide some of the vehicle handling capabilities that would otherwise be available with the selection of the tow load category.

Accordingly, it is desirable to provide an improved steering system that incorporates the actual loading condition of the vehicle in the steering calibration process, in order to achieve a more optimal degree of steering control. In addition, it is desirable to provide the improved steering system capabilities with minimal impact on the system hardware requirements. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for improving the calibration of rear wheel steering systems for vehicles. One exemplary method comprises the steps of:
 a) sensing the loading of the vehicle;
 b) generating a feedback signal corresponding to the sensed loading of the vehicle; and
 c) determining a steering system calibration for the vehicle based on the feedback signal.

The loading of the vehicle is generally sensed with either height or pressure sensors located strategically in the rear of the vehicle, or in the front and rear of the vehicle. The calibration of the rear wheel steering system is typically based on a relationship between the rear wheel angle-to-front wheel angle ratio and the vehicle speed. The calibration may be further refined for improved steering sensitivity through the use of a hand wheel angle multiplier factor.

One exemplary device comprises a vehicle rear wheel steering system with multiple calibration curves, based on vehicle loading. A load sensing device is typically configured to generate a load feedback signal corresponding to the actual loading of the vehicle. Concurrently, a speed sensing device is typically configured to generate a speed feedback signal corresponding to the actual speed of the vehicle. A steering controller is typically configured to receive the load feedback signal from the load sensing device and to determine an appropriate rear wheel steering calibration in accordance with the received load feedback signal. This rear wheel calibration generally takes the form of a plot of rear wheel angle-to-front wheel angle ratio versus vehicle speed. In addition, a hand wheel angle multiplier calibration can also be applied to the rear wheel angle calibration to improve steering sensitivity.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of calibrating the steering system of a vehicle in order to provide a driver with safe and responsive handling characteristics. For example, four wheel steering control systems are typically calibrated for a specific vehicle load category, such as normal load (e.g., curb weight plus passengers and cargo) or tow load (e.g., towing a trailer). However, vehicle loads can vary over a wide weight range within each load category, and especially in the tow category. As such, the steering calibration for a selected load category is typically adjusted to provide a compromise steering control characteristic that can reasonably accommodate the loading extremes within that load category. The exemplary embodiments disclosed herein, however, provide for an improved steering control system with multiple steering calibrations based on the actual loading of the vehicle. The exemplary steering control system typically includes a load monitor that provides actual load information to a steering controller, which then determines an appropriate steering calibration within a selected load category, based on the actual load information.

Figure 1:
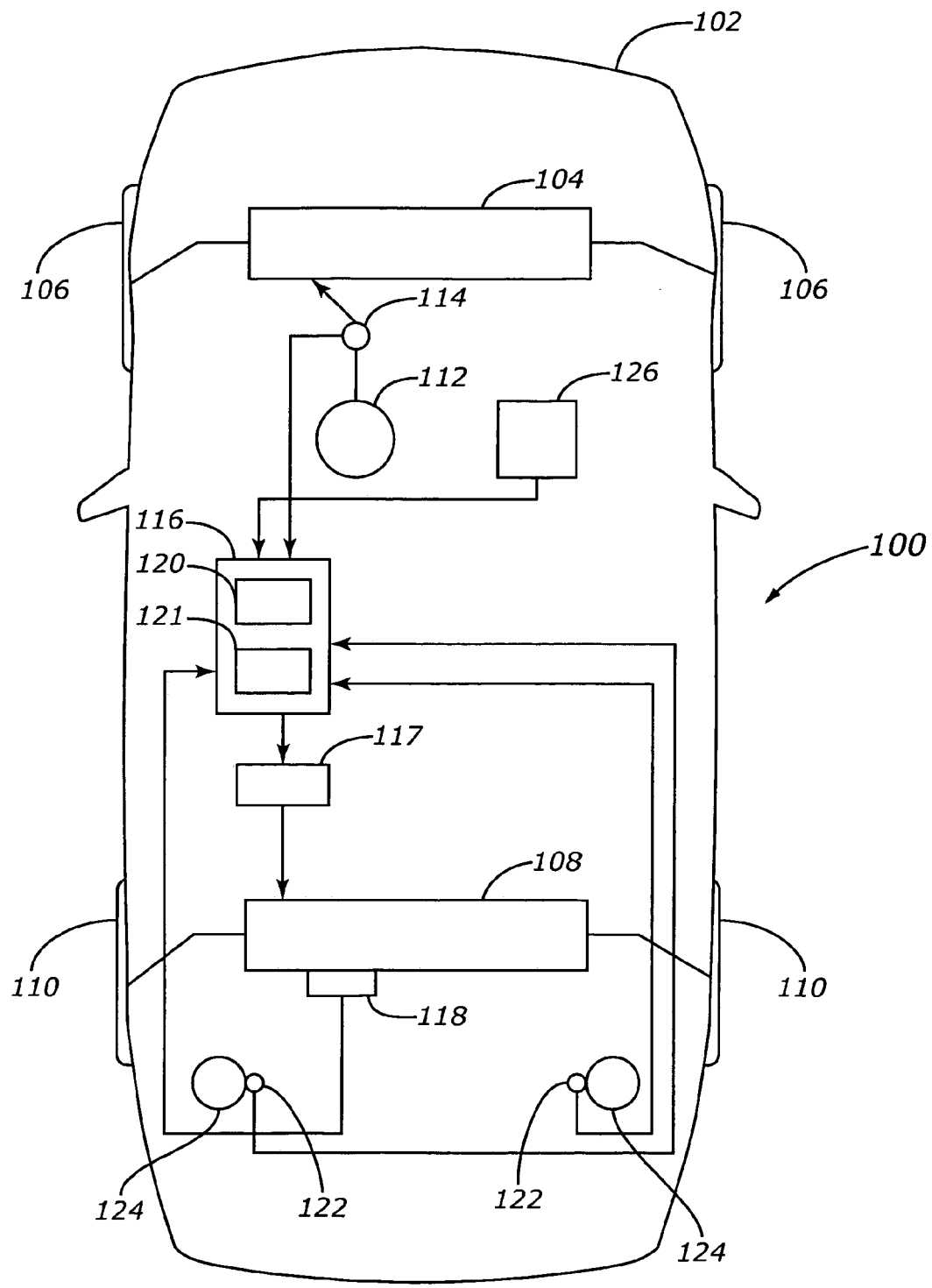
FIG. 1 is a block diagram of an exemplary embodiment of a vehicle steering control system.

According to a simplified exemplary embodiment of a four wheel steering (4 ws) system 100, as shown in FIG. 1, a vehicle 102 contains a front wheel steering gear 104 connected to front wheels 106, and a rear wheel steering gear 108 connected to rear wheels 110. A steering wheel 112 controls the front wheel steering gear 104, and thereby front wheels 106, and a steering sensor 114 provides steering wheel angle data (herein designated as hand wheel angle, or HWA) to a rear wheel steering controller 116. Steering controller 116 is configured to control the action of rear wheel steering gear 108 via any suitable type of drive mechanism 117, and to thereby control the angle of the rear wheels 110, designated herein as rear wheel angle (RWA). A rear wheel steering sensor 118 provides RWA feedback data to steering controller 116.

Steering controller 116 also receives actual load data from load sensors 122, which are associated with load bearing devices 124. While two load sensors 122 and two load bearing devices 124 are shown in this embodiment of the present invention, it will be appreciated that any appropriate number of load sensors and load bearing devices may be used in different embodiments. Load bearing devices 124 may be in the form of springs or shock mounts, or any type of shock absorbing or springing device. Load sensors 122 may be in the form of height sensors or pressure sensors, or any type of sensor capable of transmitting an output signal proportional to a load quantity. In addition, a vehicle speed sensor 126 provides actual vehicle speed data to steering controller 116.

Steering controller 116 may typically include, but not be limited to, a processor 120, a digital storage memory 121, various input/output signal interfaces and the like, and any appropriate number of pre-programmed algorithms and/or calibration curves that may be stored within memory 121. Processor 120 may be any type of microprocessor, microcontroller or other computing device capable of executing instructions in any computing language.

Figure 2:
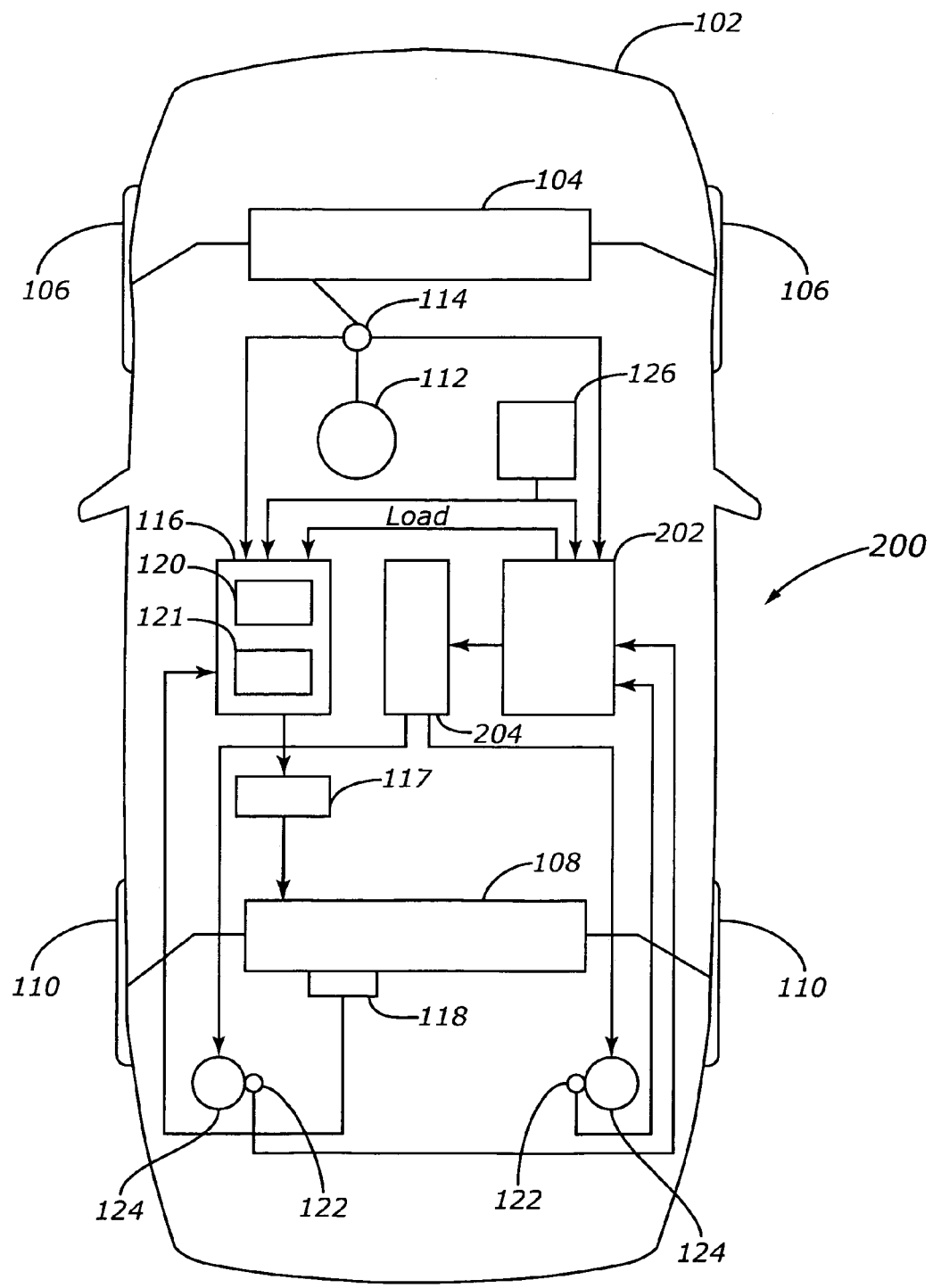
FIG. 2 is a block diagram of an exemplary embodiment of a vehicle leveling and steering control system.

Another exemplary embodiment of a four wheel steering system 200 is shown in FIG. 2. In this embodiment, a ride controller 202 typically receives actual load data from sensors 122, and provides an actual load signal to controller 116. Ride controller 202 typically uses the actual load data from sensors 122 to provide a type of leveling control for vehicle 102. The leveling control may take the form of air pressure (pneumatic) or fluid (hydraulic) feedback to load bearing devices 124 via an air compressor or a pump device 204. Ride controller 202 typically receives vehicle speed data from vehicle speed sensor 126 as well as load data from sensors 122 and HWA data from steering sensor 114, and is typically configured to generate an appropriate leveling output signal to compressor/pump device 204, based on the actual loading, speed, and HWA of vehicle 102.

A basic function of four wheel steering for most cars and trucks is the control of rear wheel steering in relationship to the steering of the front wheels. As previously indicated, rear wheel control can enhance the safety and handling performance of a vehicle under conditions such as lane changing and trailering. The relationship between the front wheel angle (FWA) and the rear wheel angle (RWA) is generally designated as the ratio of rear wheel angle-to-front wheel angle, or R/F ratio. This relationship is illustrated in FIGS. 3-5, as described below.

Figure 3:
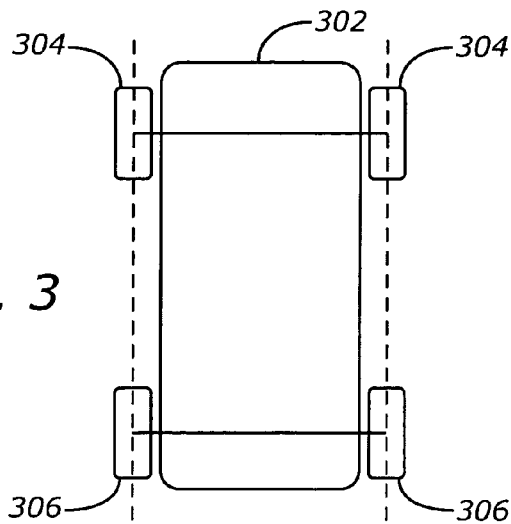
FIG. 3 is an illustration of an exemplary vehicle with zero angle front and rear wheel steering.

In FIG. 3, a vehicle 302 is equipped with front wheels 304 and rear wheels 306. In this example, all four wheels are aligned with the longitudinal vehicle axis, such that the difference between the FWA and the RWA is equal to zero degrees.

Figure 4:
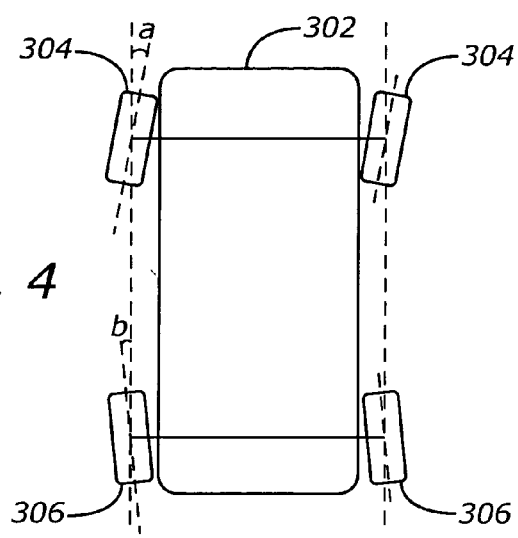
FIG. 4 is an illustration of an exemplary vehicle with positive angle front wheel steering and negative angle rear wheel steering.

In FIG. 4, vehicle 302 is shown in a typical low speed (e.g., below approximately 40 kilometers per hour) configuration. In this example, the FWA is shown as "a" and the RWA is shown as "b". At low speeds, a four wheel steering controller, such as controller 116 in FIGS. 1 & 2, typically controls the RWA so that it is opposite to the FWA direction. That is, angle a can be considered positive in this example, relative to the vehicle longitudinal axis, while angle b is negatively oriented with respect to the vehicle longitudinal axis. Moreover, angle b is typically limited by a four wheel steering controller to a value less than that of angle a. For example, at a speed of approximately 30 kph, a typical R/F ratio (b/a) might be equal to −0.2, where the minus sign indicates the negative orientation of angle b with respect to angle a. If angle a in the FIG. 3 example is equal to 12 degrees, angle b would be set at (12*−0.2), or −2.4 degrees.

Figure 5:
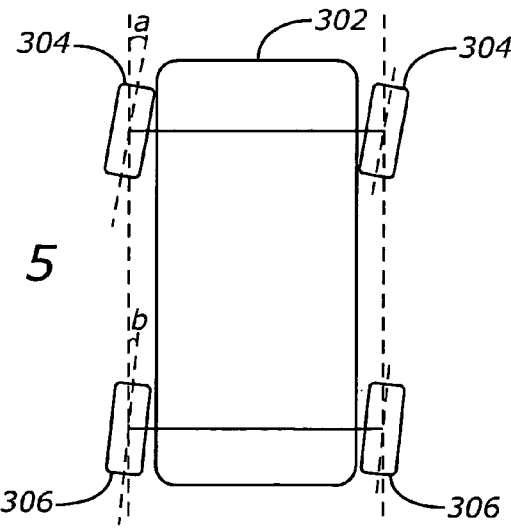
FIG. 5 is an illustration of an exemplary vehicle with positive angle front wheel steering and positive angle rear wheel steering.

In FIG. 5, vehicle 302 is illustrated in a typical medium-to-high speed configuration, i.e., at a speed above approximately 40 kph. In this example, both the FWA (a) and the RWA (b) are positively oriented relative to the vehicle longitudinal axis. For an approximate speed of 80 kph, a typical R/F ratio might be equal to 0.3. As such, a FWA of 12 degrees would typically be processed by a four wheel steering controller to a RWA of 3.6 degrees.

Figure 6:
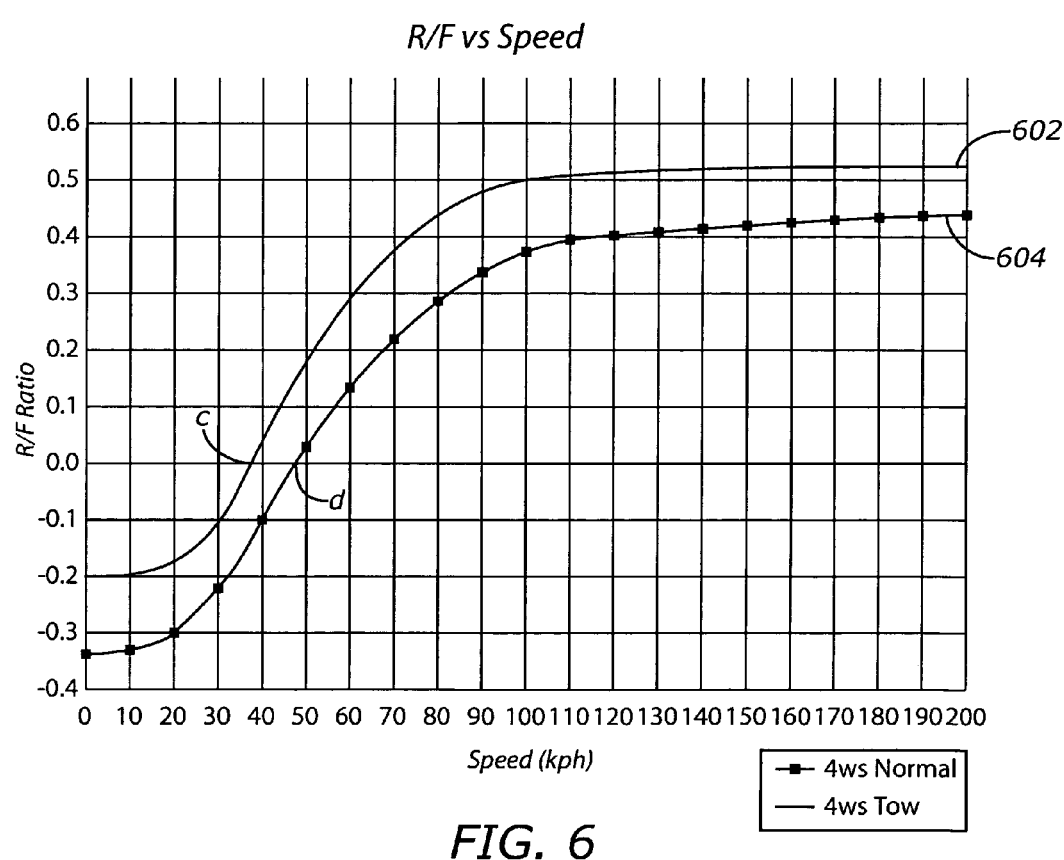
FIG. 6 is a graph of exemplary four wheel steering calibration curves for a normal category range and a tow category range.

As previously noted in the Background section, four wheel steering systems typically have one steering calibration for the normal load category, and a separate and different steering calibration for the tow category. FIG. 6 is a graphical illustration of typical calibration curves for these two categories. For the tow category, calibration curve 602 represents a continuum of pre-programmed relationships between the R/F ratio and the measured speed of vehicle 102. Point c on curve 602 indicates the crossover point where the RWA changes from negative to positive as the speed increases beyond the approximate value of 37 kph. In similar fashion, point d on normal category calibration curve 604 represents the crossover point for a normal load category R/F ratio at about 47 kph.

Calibration curves 602 and 604 in FIG. 6 represent compromise calibrations that are designed to accommodate anticipated load variations within each load category, as previously described in the background section. As such, the steering control experienced by a driver will generally be adequate with this type of compromise calibration, but will not necessarily be optimal for different loading conditions within that load category.

Figure 7:
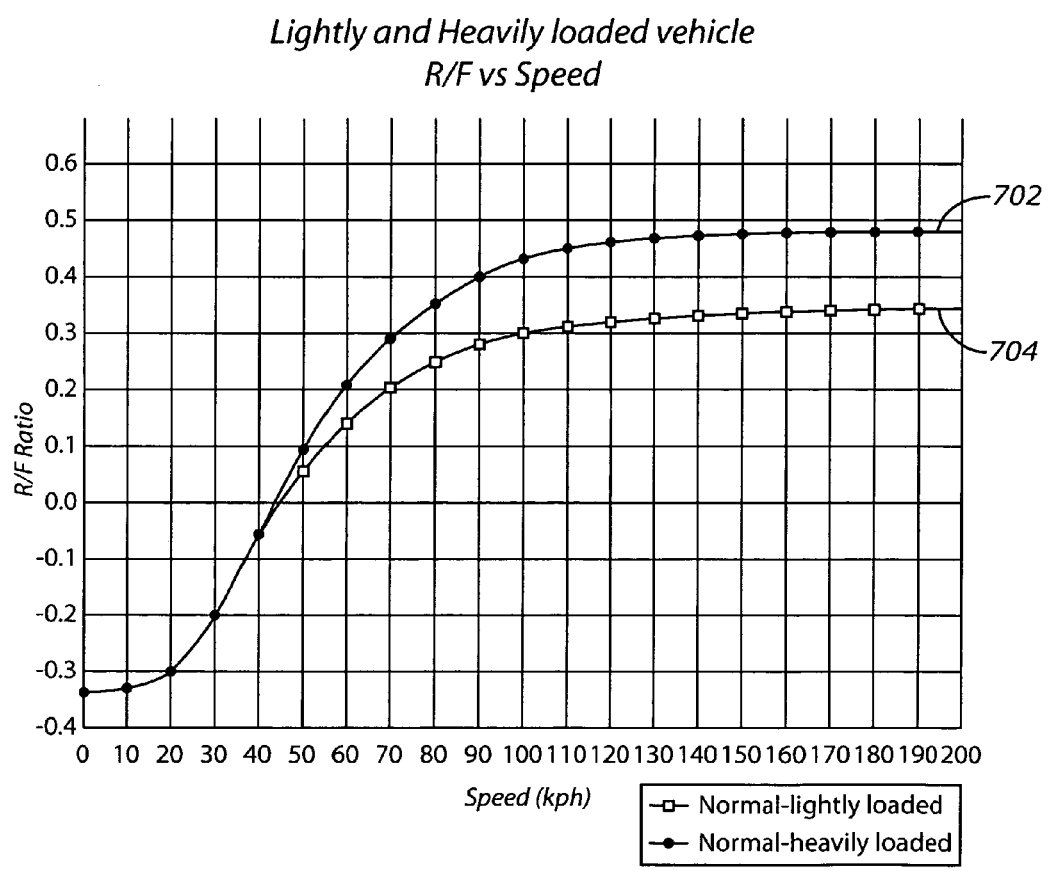
FIG. 7 is a graph of exemplary four wheel steering calibration curves for a lightly loaded normal category and a heavily loaded normal category.

To overcome the potential limitations of this type of compromise steering calibration, the exemplary embodiments described herein take into account the actual loading of a vehicle. That is, the actual load value is introduced into a four wheel steering controller in order to determine a more appropriate calibration curve related to the actual load value, rather than the "one-size-fits-all" compromise calibration curve. For example, in the embodiment illustrated graphically in FIG. 7, two calibration curves (702 & 704) may be pre-programmed into the memory of a steering controller (e.g., into memory 121 in steering controller 116 in FIGS. 1 & 2) for the normal load category. Curve 702 represents an optimally tuned calibration for the heavily loaded portion of the normal category load range, and curve 704 represents an optimally tuned calibration for the lightly loaded portion of the normal category load range.

Therefore, with reference to the FIG. 1 embodiment, when steering controller 116 receives actual load data from load sensors 122, processor 120 within controller 116 can select an appropriate one of either calibration curve 702 or 704 from memory 121. Alternately, processor 120 can be configured to generate a load-related calibration curve, such as 702 or 704 or the like, based on one or more pre-programmed algorithms stored in memory 121. In a similar manner, ride controller 202 (FIG. 2) can receive inputs from load sensors 122, and can then provide the actual load data to controller 116 to enable the selection or determination of an appropriate load-related calibration curve.

Figure 8:
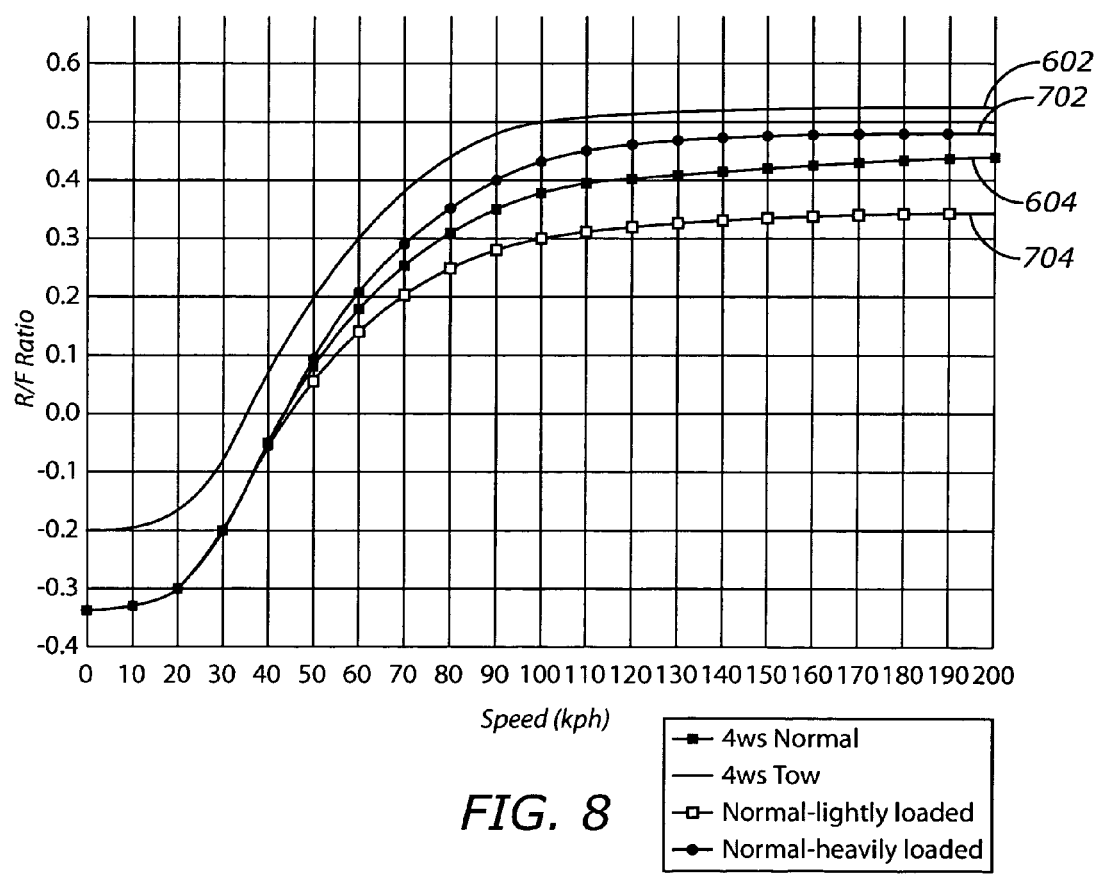
FIG. 8 is a composite graph of the exemplary four wheel steering calibration curves of FIG. 6 and FIG. 7.

For comparison purposes, compromise calibration curves 602 (tow category) and 604 (normal category) are shown together with optimally tuned calibration curves 702 (heavily loaded normal category) and 704 (lightly loaded normal category) in FIG. 8. For clarity, optimally tuned calibration curves are not shown for the tow category, but could be developed in the same manner as previously described for the normal category. A series of calibration curves for the tow category might be particularly advantageous due to the typically wide range of trailer weights, as well as other towed objects.

A secondary effect of the type of rear wheel steering control described herein is the desensitization of the hand wheel steering response in the normal load category, and especially at low speeds. To compensate for this type of hand wheel responsiveness reduction, a hand wheel angle (HWA) multiplier can be applied to the rear wheel steering control process in such a manner as to enhance the steering wheel control sensitivity. That is, HWA multiplier calibration curves can be used to more closely simulate the handling responsiveness of two wheel steering in the four wheel steering process, as will be explained below.

Figure 9:
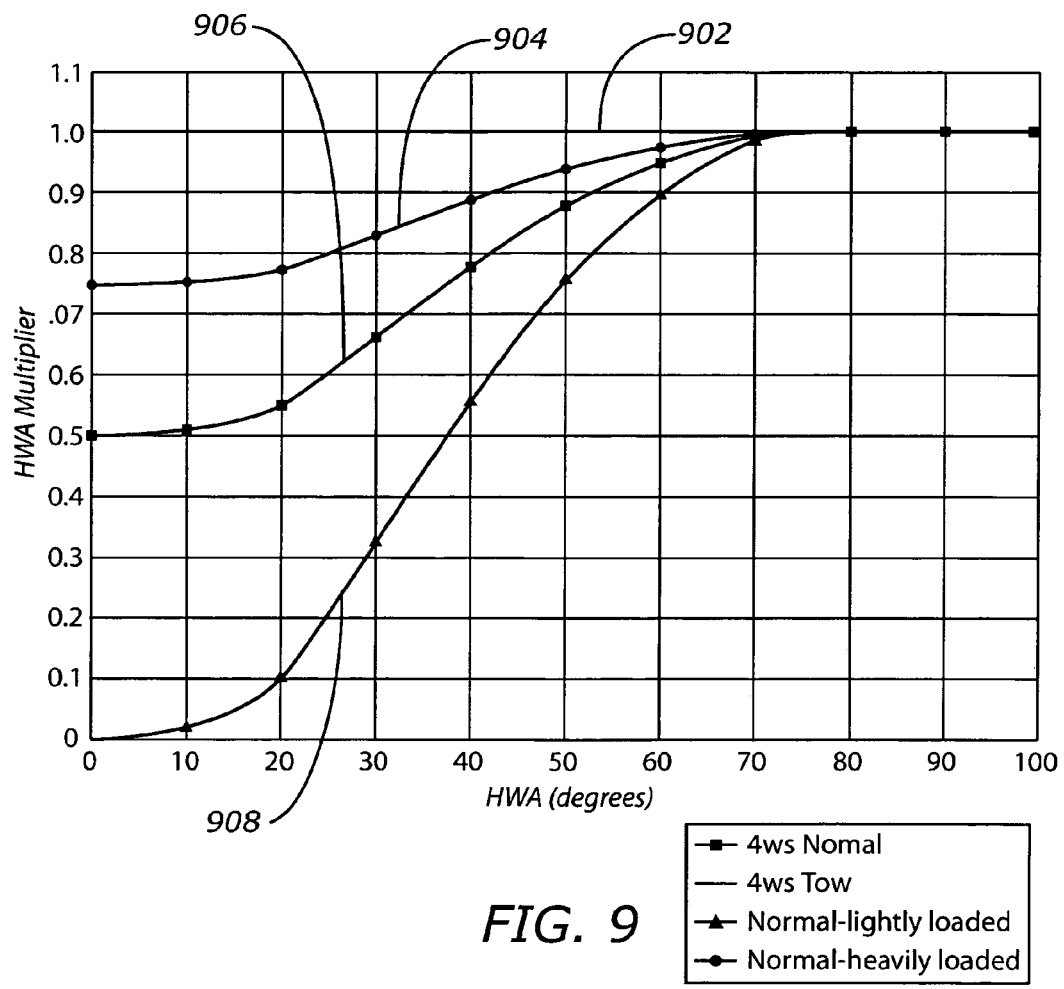
FIG. 9 is a graph of exemplary calibration curves for a vehicle hand wheel angle multiplier versus the vehicle hand wheel angle.

Exemplary HWA multiplier curves are illustrated in FIG. 9, where the HWA multiplier is plotted on the y-axis and the steering wheel angle (HWA) is plotted on the x-axis. In this example, the normal category is shown to have HWA multiplier curves 904, 906, 908. Also in this example, the tow category is shown to have a multiplier line 902 that is constant at a value equal to one. However, alternate embodiments of the present invention may have multiple tow category curves in the same manner as those shown for the normal category.

In the FIG. 9 example, curve 906 represents a compromise HWA multiplier calibration for the normal category, while curves 904 and 908 represent optimally tuned multiplier calibrations for heavily loaded and lightly loaded portions of the normal category load range, respectively. The manner in which the HWA multiplier is typically applied to the steering control process will be covered in more detail in conjunction with the flow diagrams of FIGS. 10 and 11, which depict the methodology of the exemplary embodiments heretofore disclosed.

Figure 10:
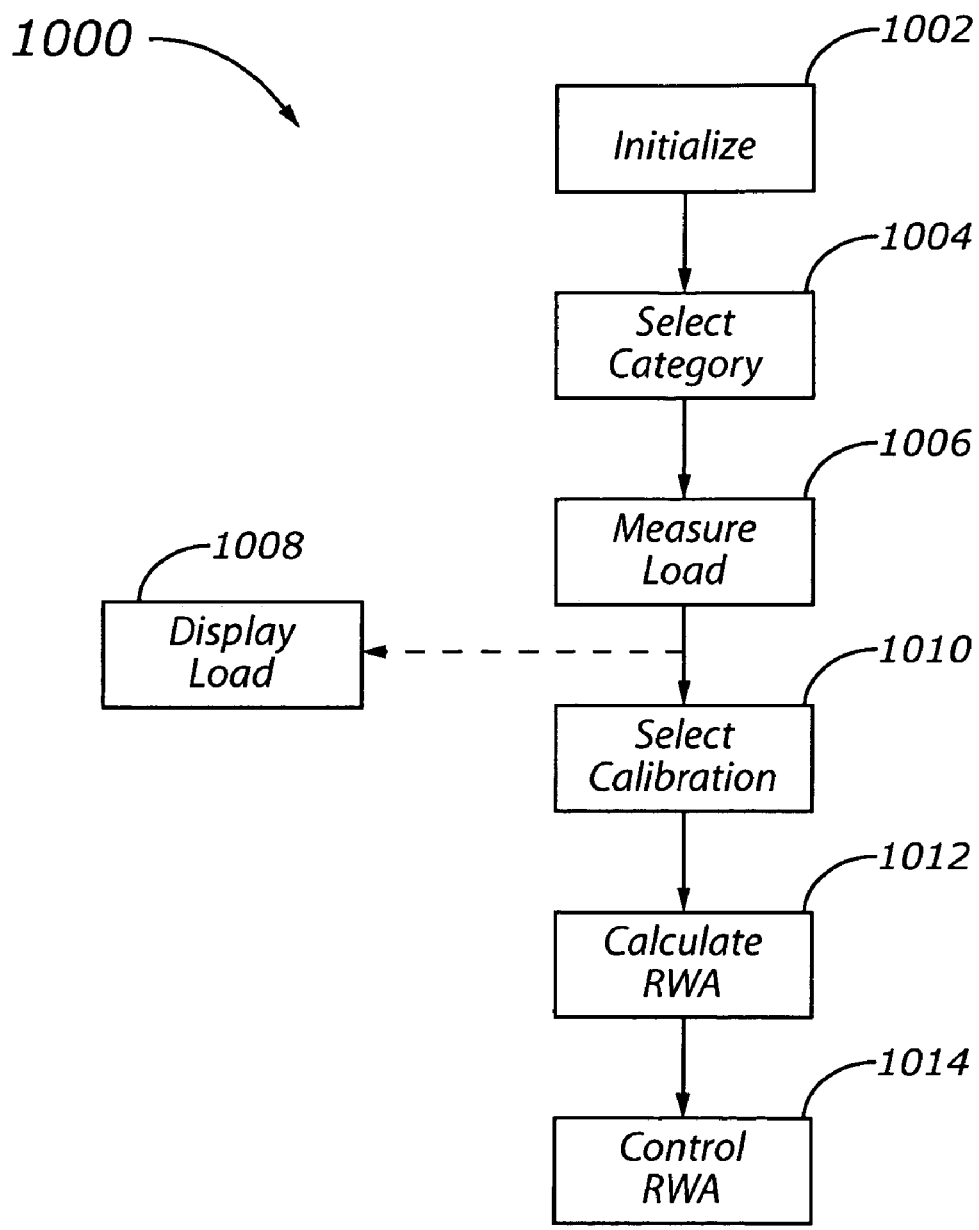
FIG. 10 is a flow diagram of an exemplary method of controlling the rear wheel angle of a vehicle.

In FIG. 10, an exemplary steering control method 1000 starts with an initialization step 1002. This step represents the pre-programmed status of processor 120 and memory 121 in steering controller 116. That is, the type of R/F and HWA calibration curves and/or calibration algorithms previously described are typically pre-programmed into processor 120 and memory 121 within controller 116.

In step 1004, a load category is selected, e.g., normal or tow. The load category can generally be selected by driver activation of an appropriate control button in the passenger cabin of a vehicle. While the load category selection is typically performed by the driver in the exemplary embodiments described herein, it is also possible that alternate embodiments might be configured to have the load category enabled automatically by processor 120, based on the measured value of the load, and/or on any other relevant parameters.

In step 1006, the vehicle 102 load is measured, either directly by signals from sensors 122 to controller 116 (FIG. 1) or via ride controller 202 (FIG. 2). Controller 116 can optionally output the measured load value to a display (step 1008), so that the driver can be made aware of the extent of vehicle loading.

In step 1010, controller 116 can select or generate an appropriate R/F calibration curve for the load category previously selected, based on the measured value of the load (step 1006). Controller 116 can also select or generate an appropriate HWA multiplier calibration curve, based on the measured value of the load. For example, referring back to the exemplary embodiments of FIGS. 7 and 9, controller 116 would typically select pre-programmed R/F calibration curve 704 for a lightly loaded normal category, and would also typically select pre-programmed HWA multiplier calibration curve 908 for a lightly loaded normal category.

In step 1012, the processor within controller 116 can calculate a desired rear wheel angle (RWA), as will be described in detail in FIG. 11, based on the previously selected calibration curves (step 1010), as well as on other parameters.

In step 1014, controller 116 can adjust rear wheel steering gear 108 (FIGS. 1 & 2) via drive mechanism 117 to direct rear wheels 110 to turn to the desired RWA.

Figure 11:
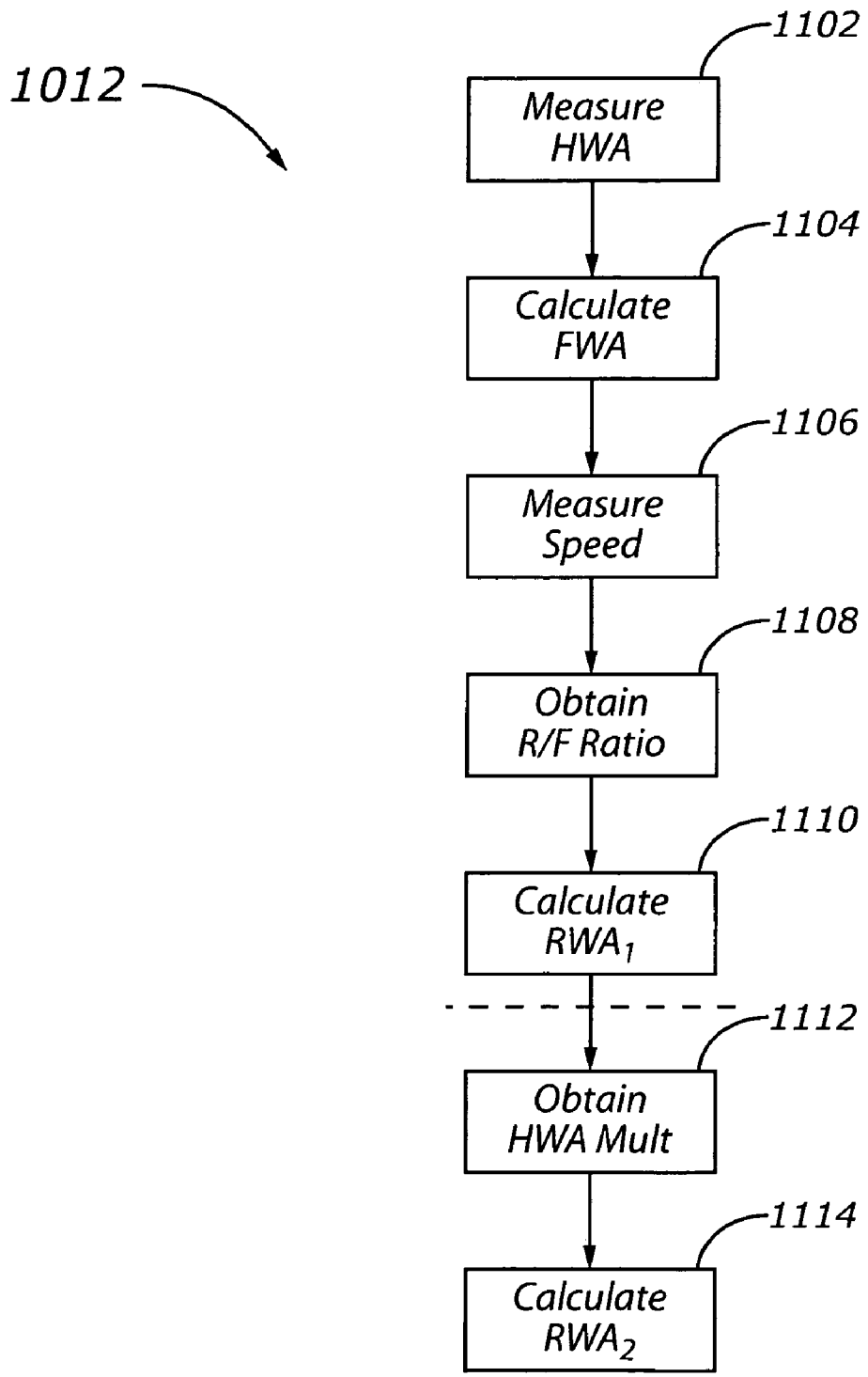
FIG. 11 is a flow diagram of an exemplary method of calculating the rear wheel angle of a vehicle.

FIG. 11 is an exemplary flow diagram that illustrates the intermediate steps that are typically taken to implement the RWA calculation in step 1012 of FIG. 10. Referring again to the embodiments illustrated in FIGS. 1 & 2, the steering wheel angle (HWA) is typically measured by steering wheel sensor 114 and entered into processor 120 within controller 116 (step 1102). Processor 120 will typically calculate the front wheel angle (FWA) from the HWA value, usually based on a predetermined relationship stored in memory 121 of controller 116 (step 1104). In step 1106, the actual vehicle speed can be determined by processor 120, based on the vehicle speed signal received by processor 120 from vehicle speed sensor 126.

In step 1108, processor 120 can "look up" the R/F ratio that corresponds to the vehicle speed determined in step 1106. For example, at a vehicle speed of 70 kph, the R/F ratio for a lightly loaded normal category (curve 704 in FIG. 7) would be equal to 0.2. Calibration curve 704, as well as the other calibration curves, may be stored in the form of look up tables in memory 121 of controller 116, or in any other suitable manner.

In step 1110, processor 120 can calculate a rear wheel angle ($RWA_1$), based on the following relationship:

$$RWA_1 = (FWA)*(R/F) \quad \text{(Equation 1)}$$

For example, if the FWA calculated in step 1104 were equal to 12 degrees, the calculated $RWA_1$ would equal 2.4 degrees, based on the previously determined R/F ratio of 0.2.

At this point, controller 116 could implement $RWA_1$, as indicated in step 1014 in FIG. 10. Alternately, if controller 116 included HWA multiplier calibration curves, as previously described in FIG. 9, the exemplary flow diagram of FIG. 11 can proceed to step 1112.

In step 1112, processor 120 can look up the HWA multiplier corresponding to the HWA previously determined in step 1102. For example, if the HWA were equal to 30 degrees, a corresponding HWA multiplier would be approximately 0.3 for a lightly loaded normal category, as indicated by exemplary calibration curve 908 in FIG. 9.

In step 1114, processor 120 can use the HWA multiplier obtained in step 1112 to calculate a modified rear wheel angle ($RWA_2$) as follows:

$$RWA_2 = (FWA)*(R/F)*(HWA\ \text{multiplier}) \quad \text{(Equation 2)}$$
$$= (RWA_1)*(HWA\ \text{multiplier})$$

For the previously calculated $RWA_1$ value of 2.4 degrees, the modified rear wheel angle calculation for $RWA_2$ would equal (2.4)*(0.3), or 0.72 degrees.

Therefore, the calculated result of either step 1110 (Equation 1) or step 1114 (Equation 2) is represented by step 1012 in FIG. 10, and can be implemented accordingly in step 1014.

Accordingly, the shortcomings of the prior art have been overcome by providing an improved rear wheel steering control in a vehicle steering system. The limitations of a single compromise rear wheel steering calibration curve for a given load category are overcome by providing multiple calibration curves to represent different levels of vehicle loading within the load category. The actual vehicle load is measured, and this load value is fed back to the steering controller. The steering controller then selects (or generates) an appropriate calibration curve for the measured load value. As such, the load-related calibration curve can provide better steering and handling responsiveness as compared to that of a single compromise calibration curve for a load category.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of calibrating a four-wheel vehicle steering system based on the loading of the vehicle, comprising the steps of:
   a) receiving a vehicle load signal and a hand wheel angle;
   b) processing the vehicle load signal to establish a relationship between a rear wheel angle and a front wheel angle of the vehicle;
   c) adjusting the relationship between the rear wheel angle and the front wheel angle based upon the hand wheel angle, wherein the adjusting comprises applying a pre-determined relationship between the hand wheel angle of the vehicle and a corresponding hand wheel angle multiplier; and
   d) applying the adjusted relationship between the rear wheel angle and the front wheel angle to the four-wheel vehicle steering system to thereby simulate the responsiveness of two-wheel steering with the four-wheel vehicle steering system and thereby calibrate the four-wheel vehicle steering system.

2. The method of claim 1 wherein the receiving step is based on sensing the rear loading of the vehicle.

3. The method of claim 1 wherein the receiving step is based on sensing the front and rear loading of the vehicle.

4. The method claim 1 wherein the pre-determined relationship is selected from a plurality of relationships based upon the loading of the vehicle.

5. The method of claim 1 wherein the relationship between the rear wheel angle ($RWA_1$) and the front wheel angle (FWA) is expressed as:

$$RWA_1 = FWA*R/F$$

where RIF is a load-based calibration value related to a speed of the vehicle.

6. The method of claim 1 wherein the adjusting step further comprises reducing the rear wheel angle ($RWA_1$) determined in the processing step in accordance with the corresponding hand wheel angle (HWA) multiplier.

7. The method of claim 6 wherein the modified rear wheel angle ($RWA_2$) is expressed as:

$$RWA_2 = (RWA_1)*(HWA\ \text{multiplier}).$$

8. A four-wheel vehicle steering system comprising:
   a load sensing device configured to generate a load feedback signal corresponding to the actual loading of the vehicle; and
   a steering controller configured to receive the load feedback signal from the load sensing device and to determine an appropriate four-wheel steering relationship between a rear wheel angle and a front wheel angle of the vehicle in accordance with the received load feedback signal, and to reduce the determined four-wheel steering relationship between the rear wheel angle and the front wheel angle in response to a hand wheel angle of the vehicle based upon a pre-determined relationship between the hand wheel angle of the vehicle and a corresponding hand wheel angle multiplier to thereby simulate the responsiveness of two-wheel steering with the four-wheel vehicle steering system.

9. The vehicle steering system of claim 8 wherein the load sensing device monitors the rear and front loading of the vehicle.

10. The vehicle steering system of claim 8 wherein the load sensing device monitors the rear loading of the vehicle.

11. The system of claim 8 wherein the steering controller is further configured to select the pre-determined relationship from a plurality of relationships based upon the loading of the vehicle.

12. The vehicle steering system of claim 8 wherein the relationship between the rear wheel angle ($RWA_1$) and the front wheel angle (FWA) is expressed as:

$$RWA_1 = FWA * R/F$$

where R/F is a load-based calibration value related to a speed of the vehicle.

13. The vehicle steering system of claim 12 wherein the steering calibration of the vehicle further comprises modifying the rear wheel angle ($RWA_1$) in accordance with the corresponding hand wheel angle (HWA) multiplier.

14. The vehicle steering system of claim 13 wherein the modified rear wheel angle ($RWA_2$) is expressed as:

$$RWA_2 = (RWA_1) * (\text{HWA multiplier}).$$

15. A four wheel steering system for a vehicle, comprising:
a front wheel steering mechanism;
a load monitor configured to measure the loading of the vehicle; and
a rear wheel steering system comprising a controller and a rear wheel steering device, wherein the controller is configured to select a load-related rear wheel steering calibration curve based on a measured load signal received from the load monitor and to select a hand wheel adjustment curve based upon a hand wheel angle of the vehicle, wherein the hand wheel adjustment curve provides a predetermined relationship between the hand wheel angle and a corresponding hand wheel angle multiplier, and wherein the controller is further configured to activate the rear wheel steering device in accordance with the load-related rear wheel steering calibration curve and the hand wheel angle multiplier from the hand wheel adjustment curve to thereby simulate the responsiveness of two-wheel steering with the four wheel steering system.

16. The four wheel steering system of claim 15 wherein the load monitor is further configured to control a vehicle leveling system in accordance with the measured load signal.

* * * * *